United States Patent
Getman et al.

[19]

[11] Patent Number: 5,969,621
[45] Date of Patent: Oct. 19, 1999

[54] APPARATUS FOR ESTABLISHING AND/OR MONITORING A PREDETERMINED FILLING LEVEL IN A CONTAINER

[75] Inventors: Igor Getman; Sergej Lopatin, both of Lörrach, Germany

[73] Assignee: Endress + Hauser GmbH + Co., Maulburg, Germany

[21] Appl. No.: 09/059,160

[22] Filed: Apr. 13, 1998

Related U.S. Application Data

[60] Provisional application No. 60/052,744, Jul. 2, 1997.

[30] Foreign Application Priority Data

Apr. 30, 1997 [EP] European Pat. Off. .............. 97107152

[51] Int. Cl.$^6$ ..................................................... G08B 21/00
[52] U.S. Cl. ........................ 340/621; 340/620; 73/290 V; 310/334; 310/369
[58] Field of Search .............................. 340/612, 621 OR, 340/620, 691.1; 73/290 V; 310/311, 320, 334, 369

[56] References Cited

U.S. PATENT DOCUMENTS

| | | | |
|---|---|---|---|
| 5,631,633 | 5/1997 | Dreyer et al. ............................ | 340/621 |
| 5,697,248 | 12/1997 | Brown .................................... | 73/290 V |
| 5,717,383 | 2/1998 | Dreyer et al. ............................ | 340/621 |
| 5,815,079 | 9/1998 | Getman et al. .......................... | 340/621 |

FOREIGN PATENT DOCUMENTS

| | | |
|---|---|---|
| 44 02 234 | 4/1995 | Germany. |
| 44 19 617 | 12/1995 | Germany. |
| 44 29 236 | 3/1996 | Germany. |
| 195 23 461 | 7/1996 | Germany. |

*Primary Examiner*—Daniel J. Wu
*Attorney, Agent, or Firm*—Bose McKinney & Evans LLP

[57] ABSTRACT

An apparatus for establishing and/or monitoring a predetermined filling level in a container is provided, in which the reception signal (E) corresponds to the desired measurement signal and in which a fixed phase difference ($\Delta\phi_R$), which is independent of the oscillation quality of the apparatus, exists between the transmission signal and the reception signal (E) at the resonant frequency ($f_r$) of the mechanical oscillatory structure (1). The apparatus comprises a mechanical oscillatory structure (1) and a piezoelectric element (2), which has at least three regions, a first region (I) having a transmission electrode (21), a second region (II) having a first reception electrode (22) and a third region (III) having a second reception electrode (23), the two reception electrodes (22, 23) having an identical form and being arranged symmetrically with respect to one another and to the transmission electrode (21), and in the first and in the second region (I, II), the piezoelectric element (2) having a polarization which is in the opposite direction to a polarization of the third region (III). The reception signal (E) is equal to the difference between a first signal ($E_1$), which is present at the first reception electrode (22), and a second signal ($E_2$), which is present at the second reception electrode (23).

6 Claims, 6 Drawing Sheets

APPARATUS FOR ESTABLISHING AND/OR MONITORING A PREDETERMINED FILLING LEVEL IN A CONTAINER

This application claims benefit of Provisional Application No. 60/052,744 filed Jul. 2, 1997.

The invention relates to an apparatus for establishing and/or monitoring a predetermined filling level in a container.

Filling level limit switches of this type are employed in many branches of industry, in particular in the chemical industry and in the foodstuffs industry. They serve the purpose of limit level detection and are used, for example, as protection against overfilling or as a safeguard against pumps running dry.

DE-A 44 19 617 describes an apparatus for establishing and/or monitoring a predetermined filling level in a container. This apparatus comprises:

a mechanical oscillatory structure, which is fitted at the level of the predetermined filling level, an electromechanical transducer,
which has at least one transmitter,
to which an electrical transmission signal is applied and
which excites the mechanical oscillatory structure to produce oscillations, and
which has a receiver,
which picks up the mechanical oscillations of the oscillatory structure and converts them into an electrical reception signal, an evaluation unit,
which picks up the reception signal and determines its frequency, compares this signal with a reference frequency and generates an output signal which indicates that the mechanical oscillatory structure is covered by a charge material if the frequency has a value which is less than the reference frequency, and that it is not covered if the value is greater, and a control loop, which regulates a phase difference existing between the electrical transmission signal and the electrical reception signal to a specific, constant value at which the oscillatory structure oscillates at a resonant frequency.

The control loop is formed, for example, by amplifying the reception signal and feeding it back via a phase shifter to the transmission signal.

DE-C 195 23 461 describes an apparatus for establishing and/or monitoring a predetermined filling level in a container, in which a mechanical oscillatory structure, which is fitted at the level of the predetermined filling level, is excited to produce oscillations by a single piezoelectric element. This element picks up the oscillations of the mechanical oscillatory structure and converts them into an electrical reception signal. It therefore serves both as a transmitter and as a receiver and has a transmission electrode and a reception electrode.

These apparatuses are complex oscillatory systems which are each composed of a mechanical oscillatory structure, an electromechanical transducer and the control loop. The individual components are not completely isolated electrically and separated mechanically from one another. Both electrical and mechanical coupling occurs.

Consequently, the reception signal comprises not only the desired measurement signal, which is ascribed to the oscillation of the respective mechanical oscillatory structure, but also additional signals produced by the aforementioned coupling.

To date, it has not been possible to employ apparatuses of this type additionally for measurements in highly viscous media or in hydrous or viscous foams, since reliable excitation of the mechanical oscillatory structure to produce oscillations at the resonant frequency is not ensured in these applications.

The fixed value of the phase difference corresponds to the resonance of the system when the oscillatory structure oscillates in gases or in liquids. However, if the oscillation quality of the apparatus is reduced for any reason, then the consequence of this is that the fixed value of the phase difference no longer exists. There is no frequency at which the mechanical oscillatory structure executes oscillations having an amplitude other than zero and the phase difference has the fixed value. This phase difference cannot be set by the control loop. Incorrect functioning consequently occurs.

A reduction in the oscillation quality occurs, for example, when the movement of the mechanical oscillatory structure is attenuated, for example by the latter being immersed in a viscous medium or in a liquid-containing or viscous foam. Furthermore, the oscillation quality is reduced by energy losses within the apparatus, for example due to instances of material fatigue or instances of asymmetry, for example on account of asymmetrical deposit formation, which lead to asymmetrical restoring forces. In principle, any type of energy loss, be it oscillation energy released to a charge material or energy released to the container via a fastening of the apparatus, leads to a reduction in the oscillation quality.

One object of the invention is to specify an apparatus for establishing and/or monitoring a predetermined filling level in a container, in which the reception signal is as far as possible identical to the desired measurement signal and does not contain any additional signals caused by coupling.

A further object of the invention consists in specifying an apparatus of this type in which a fixed phase difference, which is independent of the oscillation quality of the apparatus, exists between the transmission signal and the reception signal at the resonant frequency of the mechanical oscillatory structure.

This is achieved according to the invention by means of an apparatus for establishing and/or monitoring a predetermined filling level in a container, which apparatus comprises:

a mechanical oscillatory structure, which is fitted at the level of the predetermined filling level, a piezoelectric element,
which excites the oscillatory structure to produce oscillations and picks up its oscillations,
which has at least three regions,
a first region having a transmission electrode, a second region having a first reception electrode and a third region having a second reception electrode, the two reception electrodes having an identical form and being arranged symmetrically with respect to one another and to the transmission electrode, and in the first and in the second region, the piezoelectric element having a polarization which is in the opposite direction to a polarization of the third region, and which generates a reception signal which is equal to the difference between a first signal, which is present at the first reception electrode, and a second signal, which is present at the second reception electrode.

In accordance with a development of the invention, the apparatus has a circuit, which determines the frequency of the reception signal, compares this frequency with a reference frequency and generates an output signal which indicates that the mechanical oscillatory structure is covered by a charge material if the frequency has a value which is less than the reference frequency, and that it is not covered if the value is greater.

In accordance with a further development, the transmission signal is applied to the transmission electrode via a transmission signal line, and a control loop is provided, which regulates a phase difference existing between the transmission signal and the reception signal to a specific, constant value at which the oscillatory structure oscillates at a resonant frequency.

In accordance with one embodiment, a reference electrode connected to a reference potential is arranged on the piezoelectric element.

In accordance with a further embodiment, the piezoelectric element is in the form of a disk and the transmission electrode and the two reception electrodes are arranged on a circle surface of said element.

In accordance with a further embodiment, the two reception electrodes are circle segments which are arranged on circle segments of the circle surface which are diametrically opposite one another.

The invention and further advantages will now be explained in more detail with reference to the figures of the drawing, in which figures an exemplary embodiment is illustrated; identical elements are provided with identical reference symbols in the figures.

Figure 1:
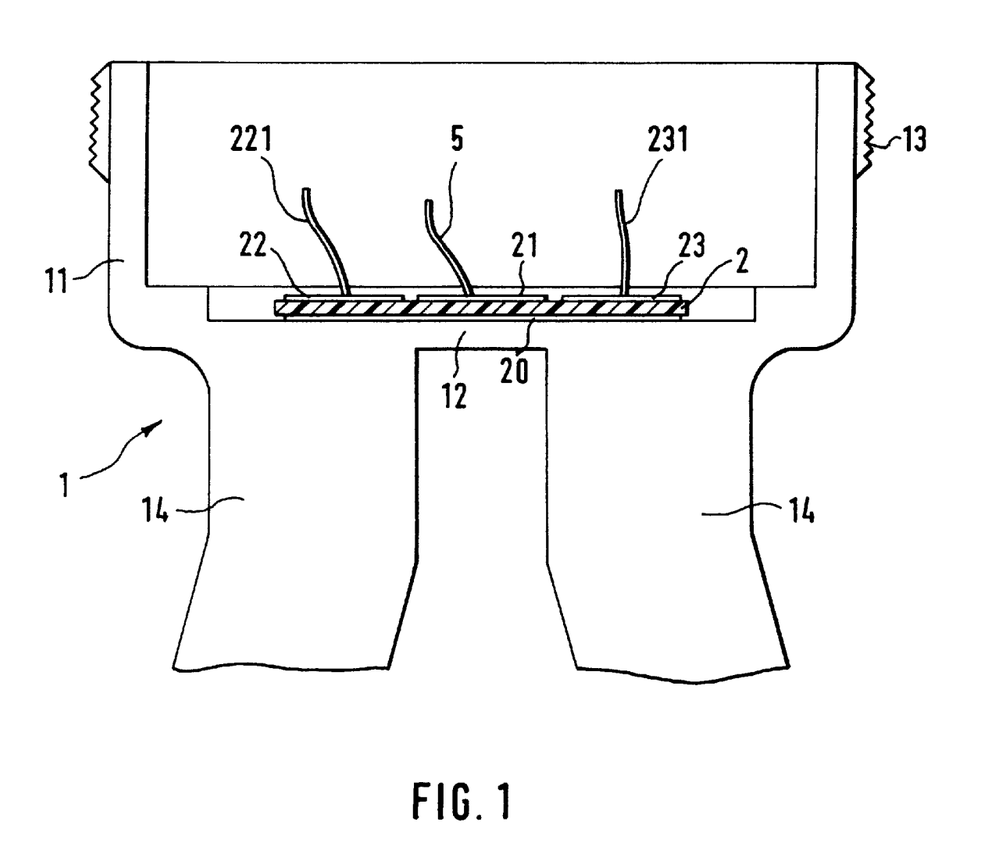
FIG. 1 shows a longitudinal section through a mechanical oscillatory structure having a piezoelectric element.

FIG. 1 shows a longitudinal section through an exemplary embodiment of a mechanical oscillatory structure 1. It has an essentially cylindrical housing 11, which is closed off flush at the front by a circular diaphragm 12.

A thread 13 is integrally formed on the housing 11, by means of which thread the apparatus can be screwed into an opening (not illustrated), which is arranged at the level of the predetermined filling level, in a container. Other fastening methods which are known to a person skilled in the art, for example by means of flanges integrally formed on the housing 11, can likewise be employed.

Two oscillating bars 14 which point into the container are integrally formed on the diaphragm 12 on the outside of the housing 11. These bars are caused to oscillate perpendicularly to their longitudinal axis by means of an piezoelectric element 2 which is in the form of a disk and is arranged on the diaphragm 12 in the interior of the housing 11.

However, the invention is not restricted to mechanical oscillatory systems having two oscillating bars; it can also be employed in limit switches which have only one or no oscillating bars. In the cases mentioned last, for example only the oscillating diaphragm comes into contact with a charge material situated in the container.

It is also possible to employ apparatuses in which the piezoelectric element 2 is arranged on a second diaphragm, which is arranged parallel to the diaphragm which closes off the housing. In this case, the oscillation of the second diaphragm is transmitted to the diaphragm which closes off the housing in that, for example, the second diaphragm is clamped in or retained on its outer edge and a mechanical connection exists from its center to the center of the other diaphragm. This connection is, for example, a tensioning bolt connecting both diaphragms or a plunger integrally formed on the inner diaphragm.

If the housing 11 is composed of metal, then the piezoelectric element 2 can be fitted directly on the diaphragm 12, for example by bonding. The housing, which is preferably grounded, then serves as a reference electrode.

Figure 2:
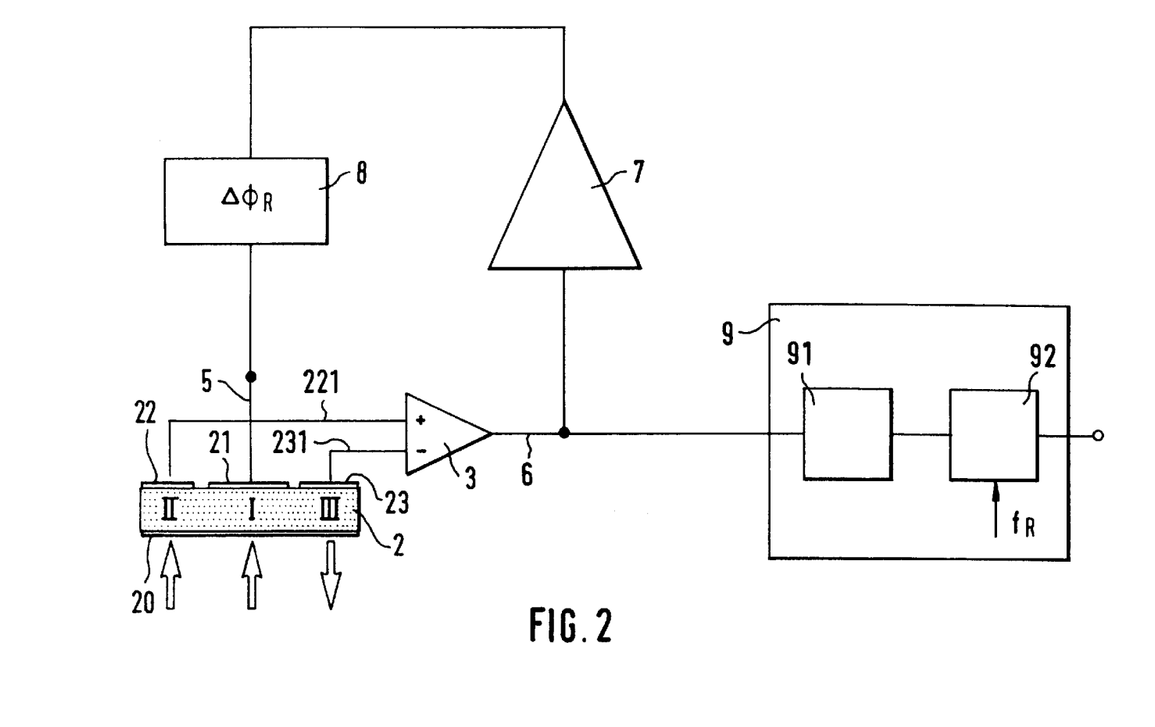
FIG. 2 shows a diagrammatic illustration of the piezoelectric element of FIG. 1 and a circuit connected thereto.

If, on the other hand, the housing 11 is composed of an insulator, then a reference electrode 20 must be arranged between the diaphragm 12 and the piezoelectric element 2, which reference electrode must be connected to a reference potential, preferably to the ground potential. FIG. 2 shows a diagrammatic illustration of the piezoelectric element 2.

Figure 3:
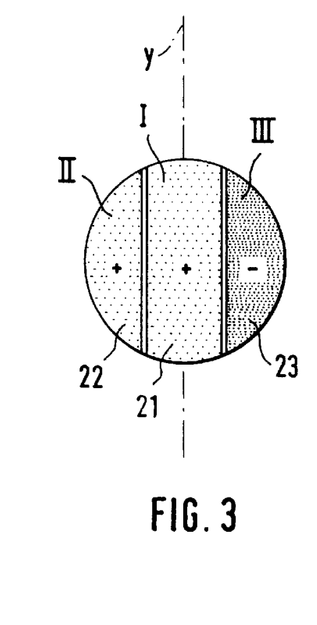
FIG. 3 shows an inventive arrangement of the transmission and reception electrodes.

A transmission electrode 21, which is connected to a transmission signal line 5, is arranged on a circle surface of the piezoelectric element 2 which is remote from the diaphragm. FIG. 3 shows the arrangement of the transmission electrode 21 and of the reception electrodes 22, 23. A transmission signal, for example an AC voltage, applied to this transmission signal line 211 causes the piezoelectric element 2, which is permanently connected to the diaphragm 12, and the diaphragm 12 to produce flexural vibrations. This causes the oscillating bars 14, whose ends are integrally formed on the diaphragm 12, to produce oscillations perpendicular to their longitudinal axis.

Conversely, an oscillation of the oscillating bars effects a flexural vibration of the composite elements comprising the diaphragm 12 and the piezoelectric element 2.

A first and a second reception electrode 22, 23 are arranged on that circle surface of the piezoelectric element 2 which is remote from the diaphragm and are respectively connected to a signal line 221, 231, via which signals $E_1$ and $E_2$ of the two reception electrodes 22, 23 are available.

The amplitudes $A_1$, $A_2$ of these electrical signals $E_1$, $E_2$ are larger, the larger the mechanical oscillation amplitude of the oscillating bars 14 is. To exploit this fact, the apparatus is preferably operated at its resonant frequency $f_r$. The mechanical oscillation amplitude is a maximum at the resonant frequency $f_r$.

If a harmonic oscillator is considered as an example of an ideal oscillatory system, then its oscillation amplitude has a single maximum as a function of the oscillation frequency. The phase difference between the oscillation excitation and the oscillation of the oscillator experiences a sudden phase change of 180° in the region of this maximum. At the resonant frequency, the oscillation amplitude is a maximum and the phase difference is 90°.

Based on the same fundamental physical principle, a fixed phase relationship between the transmission signal and the reception signal E exists in the case of resonance in the present apparatus, too. The fixed value of the phase difference is dependent on the mechanical and electrical oscillation properties of the apparatus. Measurements have shown that the values generally lie between 60° and 90°.

In the case of commercially available apparatuses of this type, only one reception electrode is provided, which electrode supplies one electrode signal.

In order that such an apparatus is made to oscillate at its resonant frequency $f_r$ a control loop is usually provided, which regulates the phase difference existing between the electrical transmission signal and an electrode signal to a specific, constant value $\Delta\phi_R$.

In a harmonic oscillator, attenuation or reduction of the oscillation quality effects a reduction in the maximum amplitude in the case of resonance. In such a case, the phase increase as a function of the frequency proceeds continuously rather than abruptly, to be precise it proceeds all the more slowly, the greater the attenuation or the reduction of the oscillation quality is. Overall, however, even with very great attenuation, a phase change of a total of 180° ensues and a phase difference of 90° exists at the resonant frequency. The fixed value, corresponding to resonance, of the phase difference of 90° always exists and is assumed at the resonant frequency.

In contrast to an ideal oscillator, coupling of an electrical and mechanical nature between the piezoelectric element 2, the transmission electrode 21 and the reception electrodes 22, 23 and the mechanical oscillatory structure exists in the abovementioned apparatus.

Mechanical coupling of the kind that might occur, for example, due to bracing of the piezoelectric element 2 is negligibly slight in the case of the apparatus described and is therefore not taken into account below.

Electrical coupling exists between the transmission electrode 21 and the reference electrode 20, between each of the reception electrodes 22, 23 and the reference electrode, and between each reception electrode 22, 23 and the transmission electrode 21. This can be illustrated, in the form of an equivalent circuit diagram, by the capacitances connecting the respective electrodes.

The effect of this capacitive coupling is that a signal which differs from zero is present at the reception electrodes 22, 23 even when the oscillating bars 14 are fixedly restrained and the diaphragm 12 is not executing any mechanical movement.

The form of the signals $E_1$ and $E_2$ present at the reception electrodes 22, 23 is explained below using the example of the signal $E_1$ of the reception electrode 22.

The signal $E_1$ is composed of two components, namely a measurement signal $E_{M1}$ and an additional signal $E_{e11}$ governed by the electrical coupling.

$$E_1 = E_{M1} + E_{e11}$$

The measurement signal $E_{M1}$ is based on the oscillation of the mechanical oscillatory structure and has a frequency-dependent amplitude $A_{M1}(f)$ and a frequency-dependent phase $\Delta\phi_{M1}(f)$. Here phase in each case denotes the phase offset of the respective component of the electrical signal $E_1$ with reference to the electrical transmission signal.

Figure 4A:
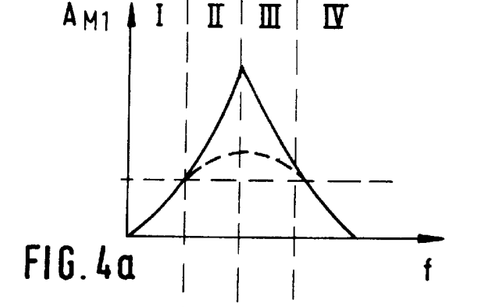
FIG. 4a shows the amplitude of the measured signal $E_{M1}$ as a function of the frequency for a high and for a low oscillation quality.
Figure 4B:
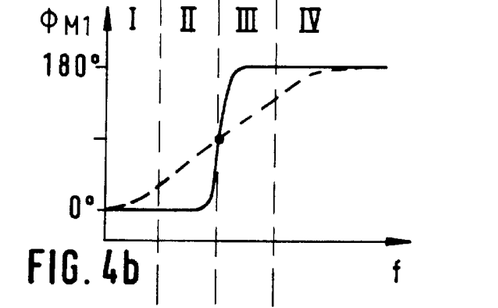
FIG. 4b shows the phase of the measurement signal $E_{M1}$ as a function of the frequency for a high and for a low oscillation quality.

FIG. 4a shows the amplitude $A_{M1}(f)$ and FIG. 4b the phase $\Delta\phi_{M1}(f)$ of the measurement signal $E_{M1}$ as a function of the frequency f. The curves can be determined computationally by simulation calculations, for example by finite element calculations.

They can be measured experimentally by connecting the transmission signal line 5 to a frequency generator and by determining the phase and amplitude of the oscillation of the oscillating bars 14 as a function of the frequency of the frequency generator, using a laser vibrometer, for example.

In each of the two FIGS. 4a, 4b, the continuous line corresponds to an apparatus having a high oscillation quality and the dashed line corresponds to an apparatus having a low oscillation quality. In both cases, both the amplitude $A_{M1}(f)$ and the phase $\Delta\phi_{M1}(f)$ of the measurement signal have the profile which is typical of a harmonic oscillator and has already been described above.

The additional signal $E_{e11}$ has an essentially constant amplitude $A_{e11}$ and an essentially constant phase $\Delta\phi_{e11}$. In this case, too, phase denotes the phase offset of the respective component of the electrical signal $E_1$ with reference to the electrical transmission signal.

Figure 5A:
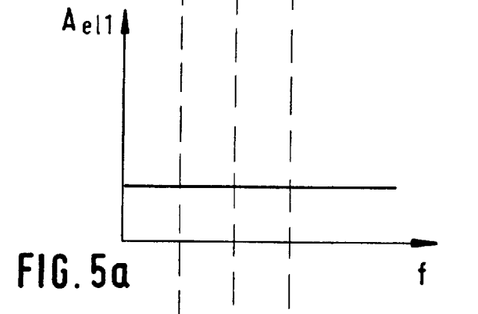
FIG. 5a shows the amplitude of an additional signal $E_{e11}$ as a function of the frequency.
Figure 5B:
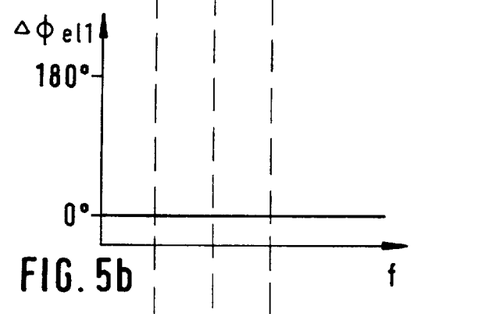
FIG. 5b shows the phase of the first additional signal $E_{11}$ as a function of the frequency.

The continuous line in FIG. 5a shows the amplitude $A_{e11}$ and the continuous line in FIG. 5b the phase $\Delta\phi_{e11}$ of the additional signal $E_{e11}$ as a function of the frequency f. These curves can also be determined by simulation calculations. They can be picked up experimentally, for example, by employing a non-polarized, piezoelectric element. In the case of the latter, no mechanical motion at all is produced by a transmission signal and the signal $E_1$ consequently corresponds to the additional signal $E_{e11}$ which is based on electrical coupling. The latter signal can be measured by means of an oscilloscope.

The amplitude $A_{e11}$ and the phases $\Delta\phi_{e11}$ of the additional signal $E_{e11}$ are unambiguously related to the mechanical structure of the respective apparatus and the electrical properties thereof. In the exemplary embodiment shown, the additional signal $E_{e11}$ has a phase of 0°.

Figure 6A:
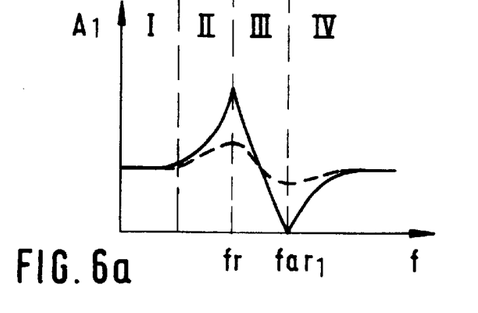
FIG. 6a shows the amplitude of the reception signal $E_1$ as a function of the frequency for a high and for a low oscillation quality.
Figure 6B:
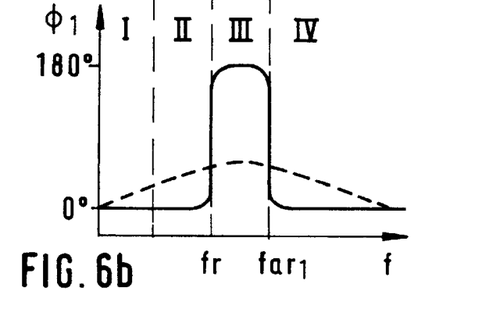
FIG. 6b shows the phase of the reception signal $E_1$ as a function of the frequency for a high and for a low oscillation quality.

FIG. 6a shows the amplitude $A_1(f)$ and FIG. 6b the phase $\Delta\phi_1(f)$ of the signal $E_1$. The two curves result from the phase- and amplitude-accurate superposition of the two above-described components of the signal $E_1$.

$$E_1 e^{i\Delta\phi} = A_{M1} e^{i\Delta\phi_{M1}} + A_{e11} e^{i\Delta\phi_{e11}}$$

Both curves each have four regions I, II, III, IV, which are described in a greatly simplified manner below.

In the outer regions I and IV, the additional signal $E_{e11}$ has the larger amplitude $A_{e11}$ and is consequently predominant.

Consequently, the resulting phase $\Delta\phi_1$ essentially corresponds to the phase of the additional signal $\Delta\phi_{e11}$.

In the regions I and II, the two signals are in phase and are added. The amplitude $E_1$ rises continuously in these regions and has a maximum at the resonant frequency $f_r$. The signals are in antiphase in the regions III and IV. The amplitude $A_1$ decreases in the region III. It is zero at the upper region boundary. At this frequency, which is referred to as the antiresonant frequency $f_{arl}$ below, the measurement signal $E_{M1}$ and the additional signal $E_{e11}$ have the same amplitude and opposite phases. The amplitude $A_1$ rises again in the region IV.

The phase $\Delta\phi_1$ is 0° in the regions I, II and IV and 180° in the region III.

Without precise knowledge of the additional signal $E_{e11}$, the measurement signal $E_{M1}$ cannot be determined from the signal $E_1$ of the reception electrode.

If the situation now arises where the mechanical oscillatory structure is damped or has a reduced oscillation quality, then the amplitude $A_{M1}(f)$ and phase $\Delta\phi_{M1}(f)$ of the measurement signal exhibit the profile illustrated by dashed lines in FIGS. 4a and 4b. The amplitude $A_{M1}(f)$ rises and falls considerably more slowly with the frequency and has a distinctly lower maximum value. The phase $\Delta\phi_{M1}(f)$ does not exhibit a sudden phase change, but rather rises continuously with the frequency. The greater the reduction in the oscillation quality of the system is, the lower the maximum value of the amplitude is and the lower the gradient of the phase is. However, the phase $\Delta\phi_{M1}(f)$ always reaches the values 0° and 180° asymptotically and it is still 90° at the resonant frequency. The additional signal $E_{e11}$ remains unchanged.

The amplitude $A_1(f)$ and phase $\Delta\phi_1(f)$ of the signal $E_1$ resulting from the amplitude- and phase-accurate superposition of the two components clearly differ from the case mentioned first, in which there was no reduction in the oscillation quality. The maxima of the amplitude $A(f)$ are a great deal less pronounced and the phase $\Delta\phi_1(f)$ has two continuous phase changes in opposite directions to one another instead of the two sudden phase changes each of 180° in opposite directions to one another. The maximum phase difference is clearly less than 180°. Depending on the oscillation quality of the system, it is even less than 90°.

If, therefore, damping of the mechanical oscillatory structure, for example in foam or in a viscous medium, or a different type of reduction in the oscillation quality of the system, occurs, then the phase difference $\Delta\phi_1$ between the electrical transmission signal and the electrical signal $E_1$ admittedly still has, as a function of the frequency, two continuous phase changes in opposite directions to one another, but the maximum phase difference may be very small. The maximum phase difference is smaller, the smaller the interval between the resonant frequency $f_r$ and the antiresonant frequency $f_{arl}$ is.

In apparatuses of the kind that can be found in the prior art, the mechanical oscillatory system is excited to produce oscillations at the resonant frequency $f_r$ in that a fixed phase relationship, corresponding to resonance, between the transmission signal and the signal of a reception electrode is established by a control loop. In order that such an apparatus is functional in the uncovered state in conjunction with a high oscillation quality, the fixed phase difference $\Delta\phi_R$ is 90° in the case shown here of the signal $E_1$.

If the previously described situation where the phase $\Delta\phi_1(f)$ of the signal no longer assumes this fixed value $\Delta\phi_R$ over the entire frequency range now occurs on account of the properties of the charge material or on account of a reduction in the oscillation quality of the apparatus, then reliable excitation of the mechanical oscillatory system is no longer possible. The apparatus is consequently not functional.

This problem is solved by the present invention.

According to the invention, the piezoelectric element 2 has at least three regions I, II, III: a first region I, on which the transmission electrode 21 is arranged, and a second and a third region II, III on which the reception electrodes 22 and 23, respectively, are arranged. The two reception electrodes 22, 23 have an identical form and are arranged symmetrically with respect to one another. They are also arranged symmetrically with respect to the transmission electrode 21. In the exemplary embodiment shown in FIG. 3, the reception electrodes 22, 23 are circle segments which are arranged on mutually diametrically opposite circle segments of that circle surface of the piezoelectric element 2 which is remote from the diaphragm. The transmission electrode 21 is arranged between the two reception electrodes 22, 23.

Other geometries can equally well be employed, provided that the reception electrodes have an identical form and are arranged symmetrically with respect to one another and to the transmission electrode. The arrangement is symmetrical with respect to a longitudinal axis y, illustrated in FIG. 3, of the circle surface.

The regions I and II have a polarization which runs parallel to the axis of symmetry of the piezoelectric element 2, in other words perpendicular to the circle surface of said element. The region III has a polarization which is in the opposite direction to that of the regions I and II. The polarization directions are indicated by arrows in FIG. 2 and by the symbols + and − in FIG. 3. As already explained at the beginning, the signal $E_1$ is composed of the measurement signal $E_{M1}$ and the additional signal $E_{e11}$. The signal $E_2$ of the reception electrode 23 is analogously composed of a measurement signal $E_{M2}$ and an additional signal $E_{e12}$.

$$E_2 = E_{M2} + E_{e12}$$

On account of the symmetry of the arrangement, the measurement signal $E_{M2}$ has an amplitude $A_{M2}$, which is equal to the amplitude $A_{M1}$ of the signal $E_1$, in the event of a flexural vibration of the composite element formed by the diaphragm 12 and the piezoelectric element 2. However, on account of the polarizations of the regions I and III of the piezoelectric element 2, which polarizations are in opposite directions, the two measurement signals $E_{M1}$ and $E_{M2}$ are in antiphase.

$$E_{M1} = A_{M1} e^{i\Delta\phi M1}$$

$$E_{M2} = A_{M2} e^{i\Delta\phi M2} = -A_{M1} e^{i\Delta\phi M1} = -E_{M1}$$

Figure 7A:
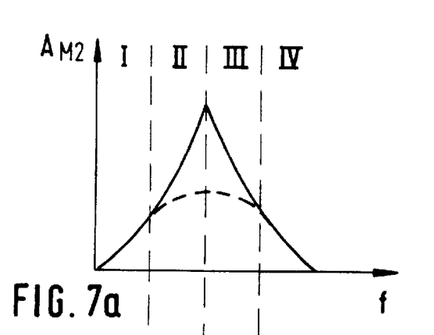
FIG. 7a shows the amplitude of the measurement signal $E_{M2}$ as a function of the frequency for a high and for a low oscillation quality.
Figure 7B:
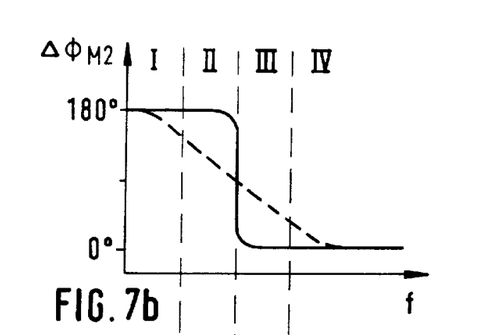
FIG. 7b shows the phase of the measurement signal $E_{M2}$ as a function of the frequency for a high and for a low oscillation quality.

FIG. 7a illustrates the amplitude $A_{M2}$ and FIG. 7b the phase $\Delta\phi_{M2}$ of the measurement signal $E_{M2}$.

The additional signal $E_{e12}$ which is governed by the capacitive coupling, of the electrode 23 has an amplitude $A_{e12}$ and a phase $\Delta\phi_{e12}$ which are equal to the amplitude $A_{e11}$ and the phase $\Delta\phi_{e11}$, respectively, of the additional signal $E_{e11}$.

The following is therefore true $$E_{e11} = A_{e11} e^{i\Delta\phi e11} = A_{e12} e^{i\Delta\phi e12} = E_{e12}$$

Figure 8A:
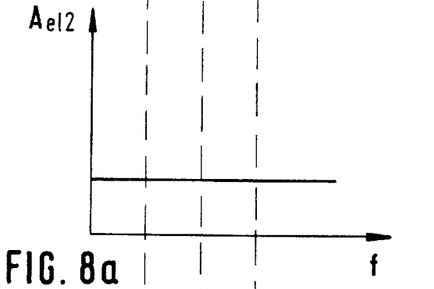
FIG. 8a shows the amplitude of an additional signal $E_{e12}$ as a function of the frequency.
Figure 8B:
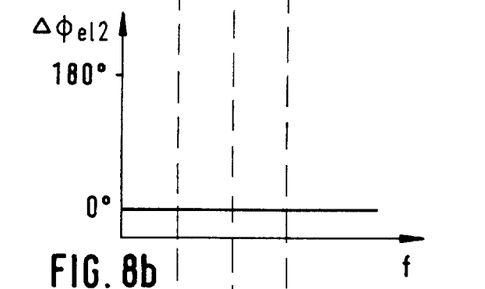
FIG. 8b shows the phase of the additional signal $E_{e12}$ as a function of the frequency.

The amplitude $A_{e12}$ and phase $\Delta\phi_{e12}$ of the additional signal $E_{e12}$ are illustrated in FIGS. 8a and 8b. The polarization direction of the regions I, II and III has no influence on the capacitive coupling which exists between the electrodes.

Figure 9A:
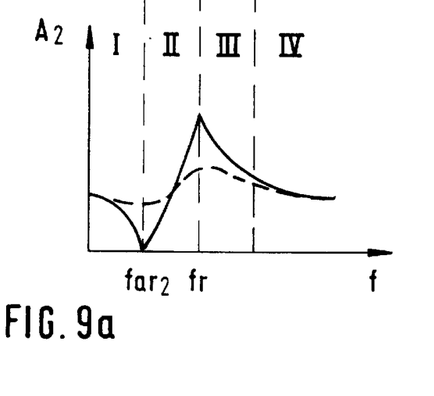
FIG. 9a shows the amplitude of the signal $E_2$ as a function of the frequency for a high and for a low oscillation quality.
Figure 9B:
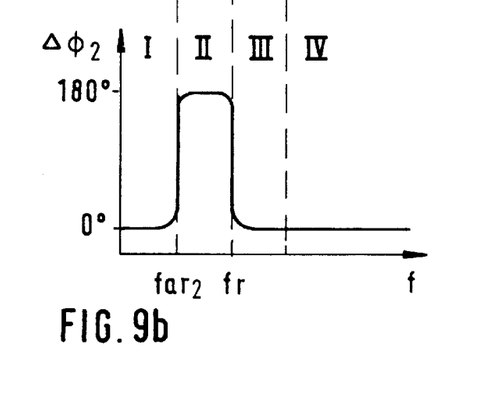
FIG. 9b shows the phase of the signal $E_2$ as a function of the frequency for a high and for a low oscillation quality.

The signal $E_2$ which is applied to the reception electrode 23 is equal to the amplitude- and phase-accurate sum of the measurement signal $E_{M2}$ and the additional signal $E_{e12}$. The phase $\Delta\phi_2$ and amplitude $A_2$ of this signal $E_2$ are illustrated in FIGS. 9a and 9b.

As shown in FIG. 2, a differential amplifier 3 is provided. The signal $E_1$ is applied via the signal line 221 to a non-inverting input of the differential amplifier 3, and the signal $E_2$ is applied via the signal line 222 to an inverting input of the differential amplifier 3. A reception signal E is available via a reception signal line 6 at an output of the differential amplifier 3. The reception signal E is equal to the phase- and amplitude-accurate difference between the signals $E_1$ and $E_2$ $$E = E_1 - E_2$$
$$= E_{M1} + E_{e11} - E_{M2} - E_{e12}$$
$$= E_{M1} + E_{e11} - (-E_{M1}) - E_{e11}$$
$$= 2\,E_{M1}$$

Figure 10:
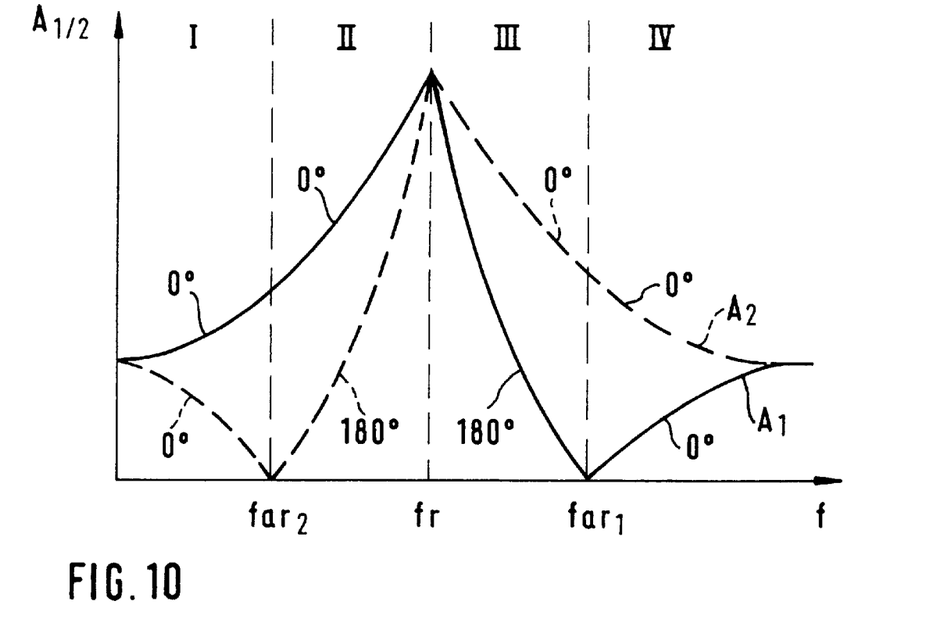
FIG. 10 shows the amplitudes $A_1$ and $A_2$ of the signals $E_1$ and $E_2$ of the two reception electrodes of FIG. 1.
Figure 11A:
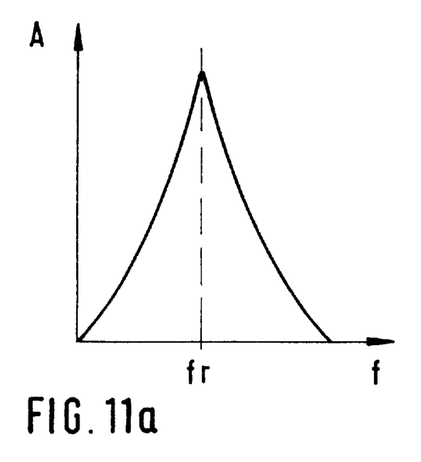
FIG. 11a shows the amplitude of the reception signal E as a function of the frequency.

For a better understanding, FIG. 10 illustrates the amplitude $A_1$ as a continuous line and the amplitude $A_2$ as a dashed line. FIG. 11a shows the amplitude A and FIG. 11b the phase $\Delta\phi$ of the resulting reception signal E. The values of the phases $\Delta\phi_1$ and $\Delta\phi_2$ of the signals $E_1$ and $E_2$ are indicated as a numerical value at the lines in FIG. 10.

In the regions I and II, the signal $E_1$ has the larger amplitude $A_1$ and is therefore predominant. In the regions III and IV, the signal $E_2$ has the larger amplitude $A_2$ and is correspondingly predominant there.

Figure 11B:
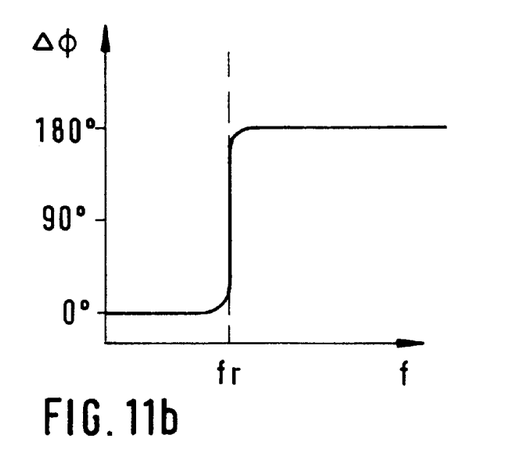
FIG. 11b shows the phase of the reception signal E as a function of the frequency.

The amplitude A of the reception signal E has a single maximum at the resonant frequency $f_r$ of the system and the phase $\Delta\phi$ experiences a sudden phase change by 180° precisely at this resonant frequency $f_r$. This profile corresponds to that of an ideal harmonic oscillator.

If the oscillation quality of the system is reduced, then the amplitude A is altered to the extent that the maximum is less pronounced. A continuous phase increase takes place instead of the sudden phase change. The gradient is lower, the greater the reduction in the oscillation quality is. However, a phase of 90° is always present at the resonant frequency $f_r$, irrespective of the oscillation quality.

Figure 12:
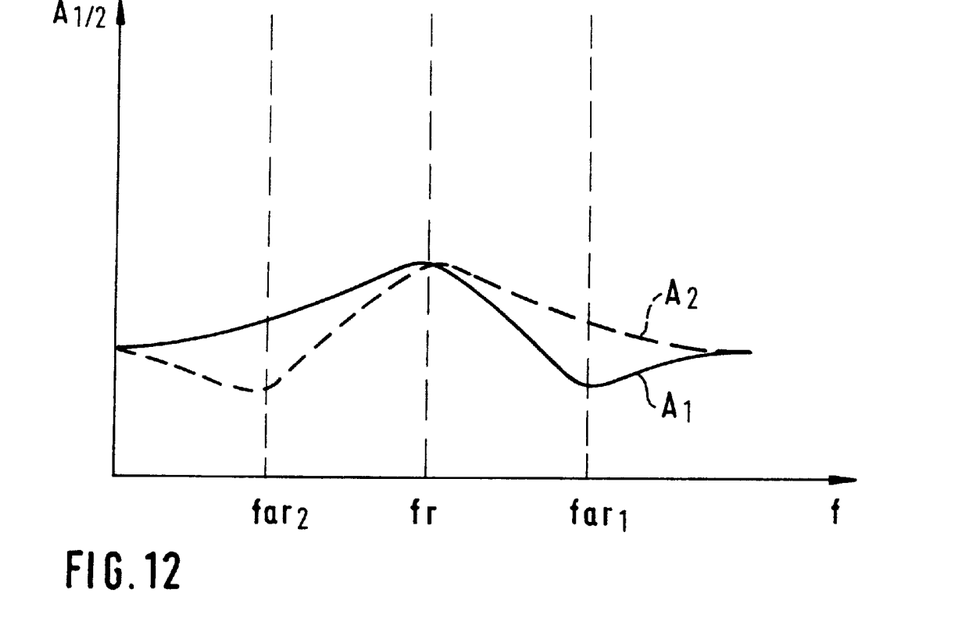
FIG. 12 shows the amplitudes $A_1$ and $A_2$ of the signals $E_1$ and $E_2$ of the two reception electrodes of FIG. 1 of an apparatus having a reduced oscillation quality.
Figure 13A:
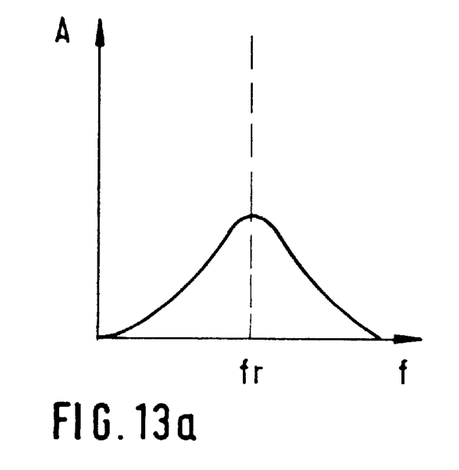
FIG. 13a shows the amplitude of the reception signal E as a function of the frequency of an apparatus having a reduced oscillation quality.
Figure 13B:
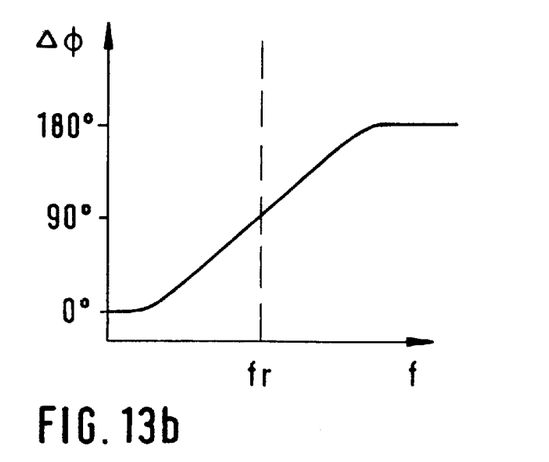
FIG. 13b shows the phase of the reception signal E as a function of the frequency of an apparatus having a reduced oscillation quality.

FIG. 12 illustrates the amplitude $A_1$ as a continuous line and the amplitude $A_2$ as a dashed line of an apparatus having a low oscillation quality. FIG. 13a shows the amplitude A and FIG. 13b the phase $\Delta\phi$ of the resulting signal E of the apparatus having a low oscillation quality.

On account of the relationships explained between the individual signals, the reception signal E is equal to twice the measurement signal $E_{M1}$ of the first reception electrode 22. By this means, a reception signal E is available which corresponds in a completely uncorrupted manner to the desired measurement signal and in which no additional signals at all are contained.

The amplitude A and phase $\Delta\phi$ of the reception signal E have, as a function of the frequency, exactly like the measurement signal $E_{M1}$, the profile which is typical of a harmonic oscillator.

As a result, the same fixed value of the phase difference $\Delta\phi_R$ is always present at the resonant frequency $f_r$ of the mechanical oscillatory structure, irrespective of the oscillation quality of the system. The reception signal E is thus outstandingly suitable for the operation of a control loop which is used for setting the fixed phase relationship $\Delta\phi_R$ between the transmission signal and the reception signal E.

An exemplary embodiment of a control loop of this type is illustrated in FIG. 2. In that case, the reception signal E is fed back to the transmission signal via the reception signal line 6, via an amplifier 7 and a phase shifter 8, which shifts its phase by the specific, constant value $\Delta\phi_R$. The amplifier 7 should be dimensioned such that the self-excitation condition is satisfied. The mechanical oscillatory structure is consequently excited by means of the piezoelectric element 2 to produce oscillations at its resonant frequency.

If the oscillatory structure is covered by the charge material, then the resonant frequency $f_r$ has a lower value than if the oscillatory structure oscillates freely. The fixed value of the phase difference is independent of whether or not the oscillatory structure is covered by the charge material.

Furthermore, the reception signal E is applied via the reception signal line 6 to the input of an evaluation unit 9. Its frequency is determined by means of a frequency-measuring circuit 91 and the result is fed to a comparator 92. The latter compares the measured frequency with a reference frequency $f_R$ stored in a memory. If the measured frequency is less than the reference frequency $f_R$, the evaluation unit 9 emits an output signal which indicates that the mechanical oscillatory structure is covered by a charge material. If the frequency has a value which is greater than the reference frequency $f_R$, then the evaluation unit 9 emits an output signal which indicates that the mechanical oscillatory structure is not covered by the charge material.

We claim:

1. An apparatus for establishing and/or monitoring a predetermined filling level in a container, which apparatus comprises:

a mechanical oscillatory structure (1), which is fitted at the level of the predetermined filling level, a piezoelectric element (2),
which excites the oscillatory structure (1) to produce oscillations and picks up its oscillations,
which has at least three regions,
a first region (I) having a transmission electrode (21), a second region (II) having a first reception electrode (22) and a third region (III) having a second reception electrode (23), the two reception electrodes (22, 23) having an identical form and being arranged symmetrically with respect to one another and to the transmission electrode (21), and in the first and in the second region (I, II), the piezoelectric element (2) having a polarization which is in the opposite direction to a polarization of the third region (III), and which generates a reception signal (E) which is equal to the difference between a first signal ($E_1$), which is present at the first reception electrode (22), and a second signal ($E_2$), which is present at the second reception electrode (23).

2. The apparatus as claimed in claim 1, which has a circuit, which determines the frequency of the reception signal (E), compares this frequency with a reference frequency ($f_R$) and generates an output signal which indicates that the mechanical oscillatory structure (1) is covered by a charge material if the frequency has a value which is less than the reference frequency ($f_R$), and that it is not covered if the value is greater.

3. The apparatus as claimed in claim 1, in which a transmission signal is applied to the transmission electrode (21) via a transmission signal line (5), and in which a control loop is provided, which regulates a phase difference existing between the transmission signal and the reception signal (E) to a specific, constant value ($\alpha\phi_R$) at which the oscillatory structure (1) oscillates at a resonant frequency ($f_r$).

4. The apparatus as claimed in claim 1, in which a reference electrode (20) connected to a reference potential is arranged on the piezoelectric element (2).

5. The apparatus as claimed in claim 1, in which the piezoelectric element (2) is in the form of a disk and the transmission electrode (21) and the two reception electrodes (22, 23) are arranged on a circle surface of said element.

6. The apparatus as claimed in claim 5, in which the two reception electrodes (22, 23) are circle segments and are arranged on circle segments of the circle surface which are diametrically opposite one another.

* * * * *